United States Patent
Park et al.

(10) Patent No.: US 11,150,728 B2
(45) Date of Patent: Oct. 19, 2021

(54) USER INTERFACE DEVICE AND CONTROL METHOD THEREOF FOR SUPPORTING EASY AND ACCURATE SELECTION OF OVERLAPPED VIRTUAL OBJECTS

(71) Applicants: KOREA INSTITUTE OF SCIENCE AND TECHNOLOGY, Seoul (KR); CENTER OF HUMAN-CENTERED INTERACTION FOR COEXISTENCE, Seoul (KR)

(72) Inventors: Jung Min Park, Seoul (KR); Joong-Jae Lee, Seoul (KR)

(73) Assignees: Korea Institute of Science and Technology, Seoul (KR); Center of Human-Centered Interaction for Coexistence, Seoul (KR)

( * ) Notice: Subject to any disclaimer, the term of this patent is extended or adjusted under 35 U.S.C. 154(b) by 0 days.

(21) Appl. No.: 16/868,100

(22) Filed: May 6, 2020

(65) Prior Publication Data

US 2021/0041944 A1 Feb. 11, 2021

(30) Foreign Application Priority Data

Aug. 7, 2019 (KR) .......................... 10-2019-0095989

(51) Int. Cl.
*G06F 3/01* (2006.01)
*G06K 9/00* (2006.01)
*G06F 3/0484* (2013.01)

(52) U.S. Cl.
CPC .............. *G06F 3/013* (2013.01); *G06F 3/017* (2013.01); *G06F 3/04842* (2013.01); *G06K 9/00671* (2013.01)

(58) Field of Classification Search
None
See application file for complete search history.

(56) References Cited

U.S. PATENT DOCUMENTS 8,150,209 B2   4/2012   Wajs
9,959,469 B2   5/2018   Inutsuka
(Continued)

OTHER PUBLICATIONS

Thanyadit et al.; "Desktop VR using a Mirror Metaphor for Natural User Interface;" Proceedings of the 2017 ACM International Conference on Interactive Surfaces and Spaces; Oct. 2017; pp. 92-99 (Year: 2017).*

(Continued)

*Primary Examiner* — Edward Martello
(74) *Attorney, Agent, or Firm* — Rabin & Berdo, P.C.

(57) ABSTRACT

Provided are a user interface device and a control method thereof for supporting easy and accurate selection of overlapped objects. The user interface device is a device for providing a user interface applied to a three-dimensional (3D) virtual space in which a plurality of virtual objects is created, and includes a gaze sensor unit to sense a user's gaze, an interaction sensor unit to sense the user's body motion for interaction with the virtual object in the 3D virtual space, a display unit to display the 3D virtual space, and a control unit to, when the user's gaze overlaps at least two virtual objects, generate projection objects corresponding to the overlapped virtual objects, wherein when an interaction between the projection object and the user is sensed, the control unit processes the interaction as an interaction between the virtual object corresponding to the projection object and the user.

11 Claims, 7 Drawing Sheets

(56) References Cited

U.S. PATENT DOCUMENTS 10,347,000 B2 7/2019 Averianov et al.
2020/0081555 A1* 3/2020 Powderly ............ G06F 3/04815

OTHER PUBLICATIONS

Alex Olwal et al., "SenseShapes: Using Statistical Geometry for Object Selection in a Multimodal Augmented Reality System", Proceedings of the Second IEEE and ACM International Symposium on Mixed and Augmented Reality, 2003.

Robert Y. Wang et al., "6D Hands: Markerless Hand Tracking for Computer Aided Design", Proceedings of the 24th Annual ACM Symposium on User Interface Software and Technology, Oct. 16-19, 2011, pp. 549-557.

Tovi Grossman and Ravin Balakrishnan, "The Design and Evaluation of Selection Techniques for 3D Volumetric Displays", Proceedings of the 19th Annual ACM Symposium on User Interface Software and Technology, Oct. 15-18, 2006, pp. 3-12.

Vildan Tanriverdi and Robert J.K. Jacob, "Interacting with Eye Movements in Virtual Environments", Proceedings of the SIGCHI Conference on Human Factors in Computing Systems, Apr. 1-6, 2000, pp. 265-272.

* cited by examiner

USER INTERFACE DEVICE AND CONTROL METHOD THEREOF FOR SUPPORTING EASY AND ACCURATE SELECTION OF OVERLAPPED VIRTUAL OBJECTS

CROSS-REFERENCE TO RELATED APPLICATION

This application claims priority to Korean Patent Application No. 10-2019-0095989, filed on Aug. 7, 2019, and all the benefits accruing therefrom under 35 U.S.C. § 119, the contents of which in its entirety are herein incorporated by reference.

BACKGROUND

1. Field

The present disclosure relates to a user interface device and method for accurately and easily selecting a specific virtual object from a plurality of virtual objects overlapped in the gaze direction of a user in a three-dimensional virtual space, and more particularly, to a user interface device and method for supporting easy and accurate selection of a virtual object through an interface for projection to prevent a plurality of virtual objects from overlapping in the gaze direction of a user.

Description about National Research and Development Support

This study was supported by the Global Frontier Project of Ministry of Science, ICT, Republic of Korea (Development of Hand-based Seamless CoUI (Coexistence User Interface) for Collaboration between Remote Users, Project No. 1711082612) under the Korea Institute of Science and Technology.

2. Description of the Related Art

Recently, in line with the rapid development of computer technology and equipment, with the development of various products, users are experiencing a variety of new interactions. Studies for efficient and improved interaction between human and computer have been made, and more recently, a Natural User Interface (NUI) was developed, and the NUI achieves interaction between a user's virtual hand and a three-dimensional (3D) virtual object in virtual space by recognizing the user's gesture, to be specific, the user's hand through a hand recognition device.

In the above-described user interface device, the user needs to move the real hand to the actual location that matches the 3D virtual object to select or grasp the 3D virtual object located on the virtual space. That is, for interaction in virtual space, it is necessary that the real hand should move to fit the virtual space, and it is difficult to use for a long term due to cumulative fatigue in hands and arms.

Additionally, miss-selection may occur due to sensor unit noise and shaky hands when selecting the 3D virtual object in virtual space. The miss-selection of the 3D virtual object may occur more frequently when a plurality of 3D virtual objects is close to each other in virtual space, in particular, when the plurality of 3D virtual objects overlap in the gaze direction of the user. That is, it is necessary to precisely select a target virtual object from the plurality of 3D virtual objects, which causes inconvenience to the user and increases the total operation/manipulation time of an electronic device.

In this circumstance, the inventor developed a user interface device and method for more accurate and efficient selection of 3D virtual objects located in virtual space.

SUMMARY

The present disclosure is directed to providing a user interface device and method for accurately and easily selecting a specific virtual object from a plurality of virtual objects overlapped in the gaze direction of a user in a three-dimensional (3D) virtual space.

A user interface device according to an embodiment of the present disclosure is a device for providing a user interface applied to a 3D virtual space in which a plurality of virtual objects is created, and includes a gaze sensor unit to sense a user's gaze, an interaction sensor unit to sense the user's body motion for interaction with the virtual object in the 3D virtual space, a display unit to display the 3D virtual space, and a control unit to, when the user's gaze overlaps at least two virtual objects, generate projection objects corresponding to the overlapped virtual objects, wherein when an interaction between the projection object and the user is sensed, the control unit processes the interaction as an interaction between the virtual object corresponding to the projection object and the user.

A method for controlling a user interface device according to another embodiment of the present disclosure is a method for controlling a device for providing a user interface applied to a 3D virtual space in which a plurality of virtual objects is created, and includes determining if a user's gaze overlaps at least two virtual objects, when the user's gaze overlaps at least two virtual objects, generating projection objects corresponding to the overlapped virtual objects, sensing the user's interaction with the projection object, and when the interaction between the projection object and the user is sensed, processing the interaction as an interaction between the virtual object corresponding to the projection object and the user.

A computer-readable recording medium containing a computer program product, the computer program product is configured to perform the step of: determining if a user's gaze overlaps at least two virtual objects; when the user's gaze overlaps at least two virtual objects, generating projection objects corresponding to the overlapped virtual objects; sensing the user's interaction with the projection object; and when the interaction between the projection object and the user is sensed, processing the interaction as an interaction between the virtual object corresponding to the projection object and the user.

The user interface device and method according to an embodiment of the present disclosure may provide an additional interface for easiness and accuracy of virtual object selection after recognizing that a user's gaze overlaps at least two virtual objects.

Accordingly, it is possible to select the overlapped virtual objects more accurately and easily, thereby reducing the miss-selection possibility, enhancing the convenience of use of the user interface, and reducing the total operation/manipulation time of an electronic device. Additionally, it is possible to reduce operations or movements to be performed for interactions in virtual space, thereby reducing fatigue of user manipulation.

DETAILED DESCRIPTION

Figure 1:
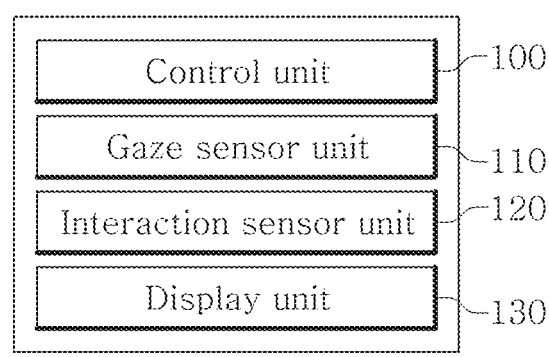
FIG. 1 is a schematic block diagram showing a configuration of a user interface device according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to positions or placement of individual elements in each disclosed embodiment without departing from the spirit and scope of the present disclosure. Accordingly, the following detailed description is not made in limiting senses, and the scope of the present disclosure is only defined by the appended claims along with the full scope of equivalents to which such claims are entitled. In the drawings, similar reference signs denote same or similar functions in many aspects.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the substantial meaning of the terms and the context throughout the specification, rather than simply the name of the terms.

Figure 2:
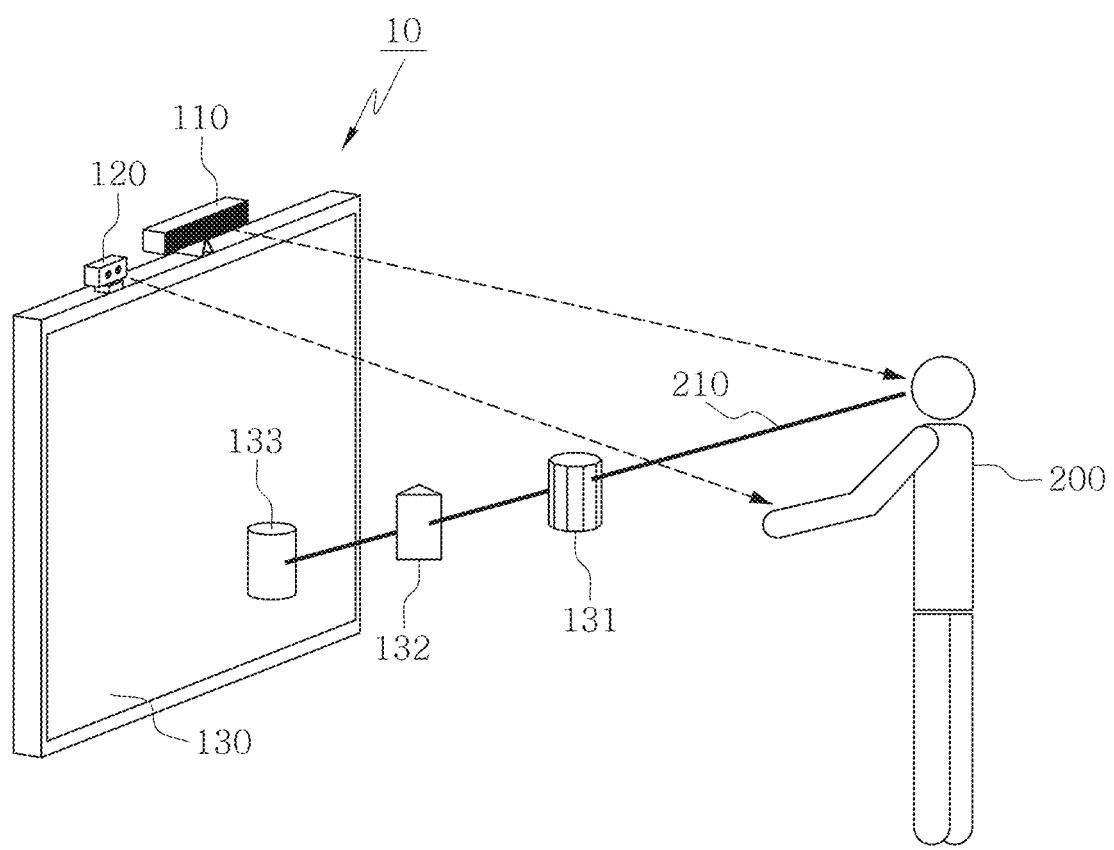
FIG. 2 is an exemplary diagram showing a positional relationship between a user interface device and a user according to an embodiment of the present disclosure.
Figure 3:
FIG. 3 is an exemplary diagram showing a three-dimensional virtual space to which a user interface device is applied according to an embodiment of the present disclosure.

FIG. 1 is a schematic block diagram showing a configuration of a user interface device according to an embodiment of the present disclosure. FIG. 2 is an exemplary diagram showing a positional relationship between the user interface device and a user according to an embodiment of the present disclosure. FIG. 3 is an exemplary diagram showing a three-dimensional (3D) virtual space to which the user interface device is applied according to an embodiment of the present disclosure.

Referring to FIGS. 1 to 3, the user interface device 10 includes a control unit 100, a gaze sensor unit 110, an interaction sensor unit 120 and a display unit 130. The user interface device 10 according to the embodiments and each device or unit of the user interface device 10 may have aspects of entirely hardware, or partly hardware and partly software. For example, each element of the user interface device 10 according to an embodiment of the present disclosure refers to a combination of hardware and software that is executed by the corresponding hardware. The hardware may be a data processing device including Central Processing Unit (CPU) or other processor. Additionally, the software that is executed by the hardware may refer to a process being executed, an object, an executable, a thread of execution, and a program.

The user interface device 10 may be a device or a system for providing a user interface that is applied to the 3D virtual space. The user interface device 10 may be connected to or included in the device or system for providing the 3D virtual space. The 3D virtual space, to which the user interface device 10 according to this embodiment is applied, may include virtual space content in which at least one or more user may participate.

The virtual space is where a plurality of virtual objects having a predetermined physical quantity may be created. The plurality of virtual objects may make physical movements on the virtual space, mimicking the user's body part or the real object. The plurality of virtual objects may include graphical information and physical information. Here, the graphical information may be information for rendering the plurality of virtual objects in the virtual space, and the physical information may be information about a physical quantity for applying the law of physics of the plurality of virtual objects and a contact point for recognizing contact with a virtual object having different physical information. As shown in FIG. 3, the virtual space may be created as a virtual market, and the plurality of virtual objects corresponding to products in the market may be placed on shelves. Here, the plurality of virtual objects placed on the shelves may appear to overlap in whole or in part depending on the point of view. The user interface device 10 according to an embodiment of the present disclosure may provide an interface and method for easier selection of the virtual objects overlapped in the gaze direction of the user. In detail, the user interface device 10 provides the user with a virtual mirror for easily selecting at least one of the plurality of virtual objects displayed on the display unit 130, and determines which a virtual object is selected by the user among the plurality of virtual objects.

The gaze sensor unit 110 determines which virtual object the user's gaze 210 is directed towards, by sensing the user's gaze. Additionally, the gaze sensor unit 110 determines if the user's gaze 210 overlaps the plurality of virtual objects 131, 132, 133, by sensing the user's gaze 210. As shown in FIG. 2, the first virtual object 131, the second virtual object 132 and the third virtual object 133 may be overlapped in the user's gaze 210. The shape and placement location of the virtual object shown in FIG. 2 are provided by way of illustration and not limited thereto. Here, overlap is not limited to complete overlap between the second virtual object 132 located closer to the user 200 and the third virtual object 133 located farther away from the user 200, so that the third virtual object is not seen in the gaze direction of the user 200. That is, in this embodiment, overlap may include partial overlap between the second virtual object 132 and the third virtual object 133.

The interaction sensor unit 120 may sense a body motion of the user 200. The body motion of the user 200 may be an action for interaction between the virtual object and the user 200 in the virtual space, for example, an action of grasping or moving the virtual object. Additionally, when the user 200 performs the above-described interaction using the hand of the body, the interaction sensor unit 120 may sense the hand of the user 200. The interaction sensor unit 120 may include a recognition unit such as a hand recognition device, and may sense the location and/or shape of the hand of the user 200 and reflect a change of the hand of the user 200 and/or interaction generated by the hand on the virtual space. Here, the hand of the user 200 may be modeled as a virtual hand and reflected on the virtual space. The location and/or shape of the hand of the user 200 sensed by the interaction sensor unit 120 may be reflected on the virtual hand of the virtual space, and the virtual hand may be changed depending on the sensed result.

The display unit 130 may provide the virtual space to the user 200. The display unit 130 may display the virtual space in which the plurality of virtual objects 131, 132, 133 is created, and provide the scene corresponding to selection and manipulation of the user 200. The display unit 130 may include various types of 3D displays, for example, stereoscopes, 3D displays using binocular disparity, holographic displays, 3D volumetric displays or 3D plasma displays using laser.

The control unit 100 may control the entire operation of the gaze sensor unit 110, the interaction sensor unit 120 and the display unit 130, and perform various calculations required for the operation of the user interface device 10. Additionally, the control unit 100 may provide the user with an interface for easily selecting at least one of the plurality of virtual objects 131, 132, 133 overlapped in the current gaze of the user 200. Hereinafter, it will be described in more detail with reference to FIGS. 4 to 6.

Figure 4:
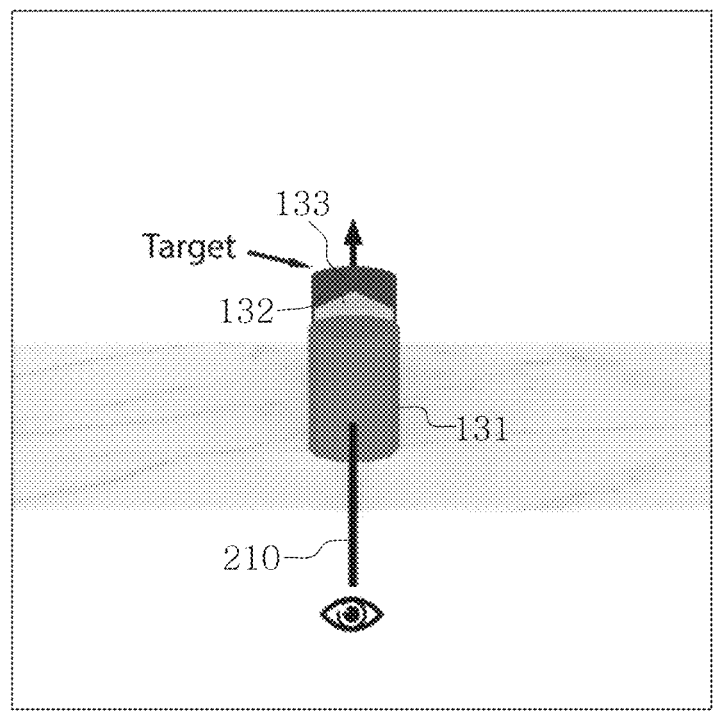
FIGS. 4 to 6 are exemplary diagrams showing a process in which a user interface device provides an additional interface for easiness of virtual object selection according to an embodiment of the present disclosure.
Figure 5:
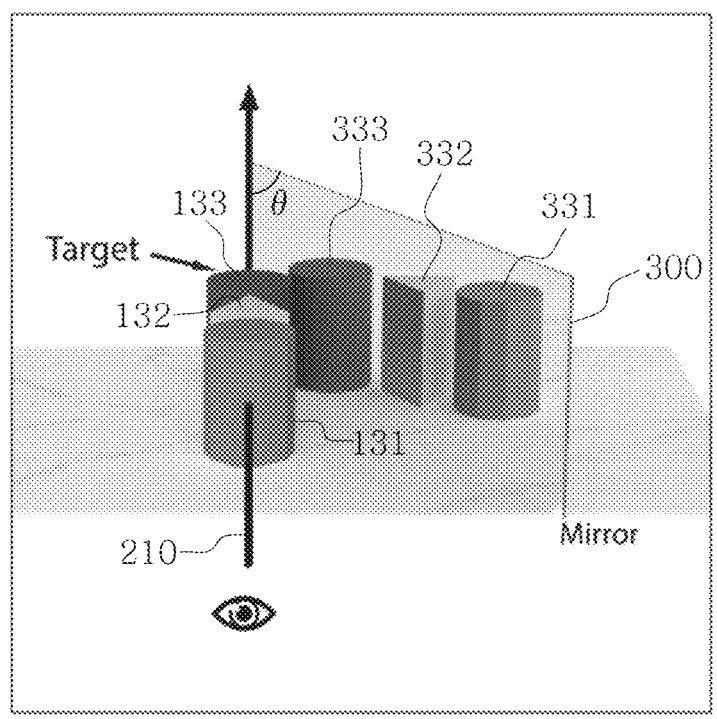
Figure 6:
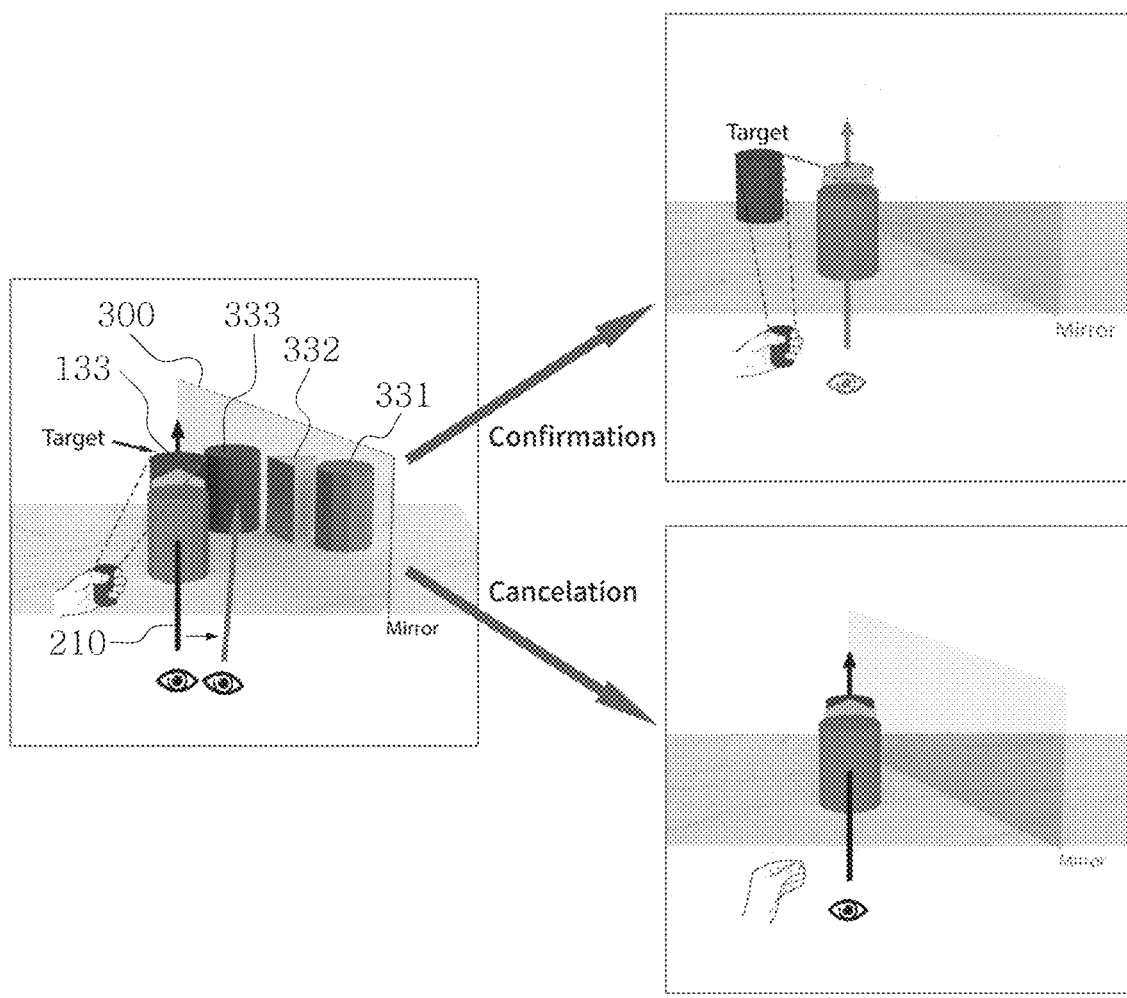

FIGS. 4 to 6 are exemplary diagrams showing a process in which the user interface device provides an additional interface for easiness of virtual object selection according to an embodiment of the present disclosure, and schematically show the scene provided to the user through the display unit 130.

The gaze sensor unit 110 may calculate the user's gaze based on the user's current location. In detail, the gaze sensor unit 110 measures locations of each of the user's eyes, and calculates an average location of the eyes. Additionally, the gaze sensor unit 110 measures gaze directions of each of the eyes, and calculates an average gaze direction by averaging the gaze directions of the eyes. The gaze sensor unit 110 may derive an average user's gaze by combining the average location of the eyes and the average gaze direction of the eyes. Here, the user's gaze may be calculated as a vector value having a magnitude and a direction.

The control unit 100 receives the user's gaze calculated from the gaze sensor unit 110, and determines if the user's gaze and the virtual object overlap. The control unit 100 may determine if the user's gaze and the virtual object overlap by determining if the user's gaze is located within a predetermined distance from an object center of the virtual object. That is, when the user's gaze passes through an overlap range formed on the basis of the object center of the virtual object, the control unit 100 may determine that the user's gaze and the virtual object overlap. Here, the virtual object may have physical information, and the object center may correspond to the center of gravity of the virtual object but is not limited thereto. Additionally, the overlap range formed on the basis of the object center may correspond to the rendered appearance of the virtual object, but is not limited thereto. The overlap range may be defined beyond the rendered appearance of the virtual object.

The control unit 100 may determine if the user's gaze passes through the overlap ranges formed by each of the plurality of virtual objects. When the user's gaze successively passes through the overlap ranges of at least two virtual objects, it will be easy for the user to select the virtual object located close to the user. However, the virtual object located far away from the user is hidden by the virtual object located close to the user in the user's gaze, and will be difficult for the user to accurately select.

For example, as shown in FIG. 4, the user's gaze 210 may pass through all the plurality of virtual objects 131, 132, 133. That is, the plurality of virtual objects 131, 132, 133 may be overlapped in the gaze direction of the user, and the virtual object 133 located farthest away from the user may be the target object that the user intends to select. For the user to see the target virtual object 133 for accurate selection of the virtual object 133, it is impossible to achieve by changing the user's gaze at the user's current location or changing the posture in the same place, and it is necessary to change the user's location.

Here, the control unit 100 according to an embodiment of the present disclosure may provide the additional interface for easiness and accuracy of virtual object selection after recognizing that the user's gaze overlaps at least two virtual objects.

The control unit 100 according to an embodiment of the present disclosure may further display projection objects corresponding to the plurality of objects overlapped in the user's gaze at different locations that do not overlap the user's gaze. That is, the control unit 100 may generate projection objects corresponding to the plurality of objects overlapped in the user's gaze and provide the projection objects to the user. Here, the location of the projection objects on the virtual space does not overlap the user's current gaze, but can be seen from the user's current location. That is, the user may see the location, shape and size of the projection objects at the current location, and easily select a project object.

For example, when the user's gaze successively passes through the overlap ranges of at least two virtual objects, the control unit 100 may form a virtual mirror as shown in FIG. 5. The virtual mirror 300 may include the projection objects 331, 332, 333 onto which the overlapped virtual objects 131, 132, 133 are projected. The virtual mirror 300 may form a predetermined angle with the user's gaze 210 and may be provided to the virtual space. Accordingly, the projection objects 331, 332, 333 included in the virtual mirror 300 do not overlap the user's gaze 210, and the user may easily see the location, shape and size of the projection objects 331, 332, 333 by changing the gaze direction at the current location. The predetermined angle formed by the user's gaze and the virtual mirror may be an acute angle to allow the user to easily observe the projection objects 331, 332, 333 included in the virtual mirror. For example, the predetermined angle may be equal to or higher than 45° and less than 90°, but is not limited thereto. The predetermined angle formed by the virtual mirror 300 and the user's gaze 210 may be determined in consideration of at least one of the distance between the user and the plurality of virtual objects 131, 132, 133, and the placement location of the plurality of virtual objects 131, 132, 133. For example, as the distance between the user and the plurality of virtual objects 131, 132, 133 is smaller, the predetermined angle may be higher. Additionally, as the placement location of the plurality of virtual objects 131, 132, 133 and the distance between them is smaller, the predetermined angle may be higher.

The projection objects 331, 332, 333 generated by the control unit 100 and the corresponding virtual objects 131, 132, 133 may have the same physical information and graphical information, and only have different locations. That is, the user may interact with the projection objects 331, 332, 333, for example, may select the projection objects 331, 332, 333. As shown in FIG. 6, the user may easily see the location, shape and size of the projection objects 331, 332, 333 by changing the gaze direction at the current location, and the user may easily interact with the projection object 333 corresponding to the target object 133. Here, the interaction sensor unit 120 may sense the user's body motion, for example, the location or shape of the hand, and the control unit 100 may recognize interaction between the user and the projection objects 331, 332, 333 in the virtual environment based on the sensing data provided by the interaction sensor unit 120. The user may interact with at least one of the plurality of projection objects 331, 332, 333. For example, the user may select the projection object 333. The user's interaction with the projection object 333 may affect the corresponding virtual object 133. That is, the projection objects 331, 332, 333 are formed for effective interaction of the overlapped virtual objects 131, 132, 133, and a result of the user's interaction with the projection object 333 may be reflected on the corresponding virtual object 133. For example, when the user selects the projection object 333, the control unit 100 may regard and process as the user having selected the corresponding virtual object 133. The display unit 130 may display that the virtual object 133 is selected according to the data processed by the control unit 100.

In some embodiments, after the user selects the projection object 333, the control unit 100 may request the user to confirm the selection. After the user confirms the selection, the control unit 100 may process as the user having selected the virtual object 133 corresponding to the projection object 333. The confirmation for the selection may be, for example, an action of selecting the projection object 333 continuously for a predetermined period of time or the user's specific motion sensed, but is not limited thereto.

Additionally, in some embodiments, after generating the projection object 333, namely, after generating the virtual mirror 300, the control unit 100 may determine whether to maintain it. For example, the control unit 100 may cancel the generation of the virtual mirror 300 when the user's motion is not sensed for a predetermined time or longer or the user's specific motion for removing the virtual mirror 300 is sensed.

The user interface device 10 according to an embodiment of the present disclosure may provide the additional interface for easiness and accuracy of virtual object selection after recognizing that the user's gaze overlaps at least two virtual objects. Accordingly, it is possible to select the overlapped virtual objects more accurately and easily, thereby reducing the miss-selection possibility, enhancing the convenience of use of the user interface, and reducing the total operation/manipulation time of an electronic device. Additionally, it is possible to reduce operations or movements to be performed for interactions in virtual space, thereby reducing fatigue of user manipulation.

Hereinafter, a method for controlling a user interface device according to another embodiment of the present disclosure will be described.

Figure 7:
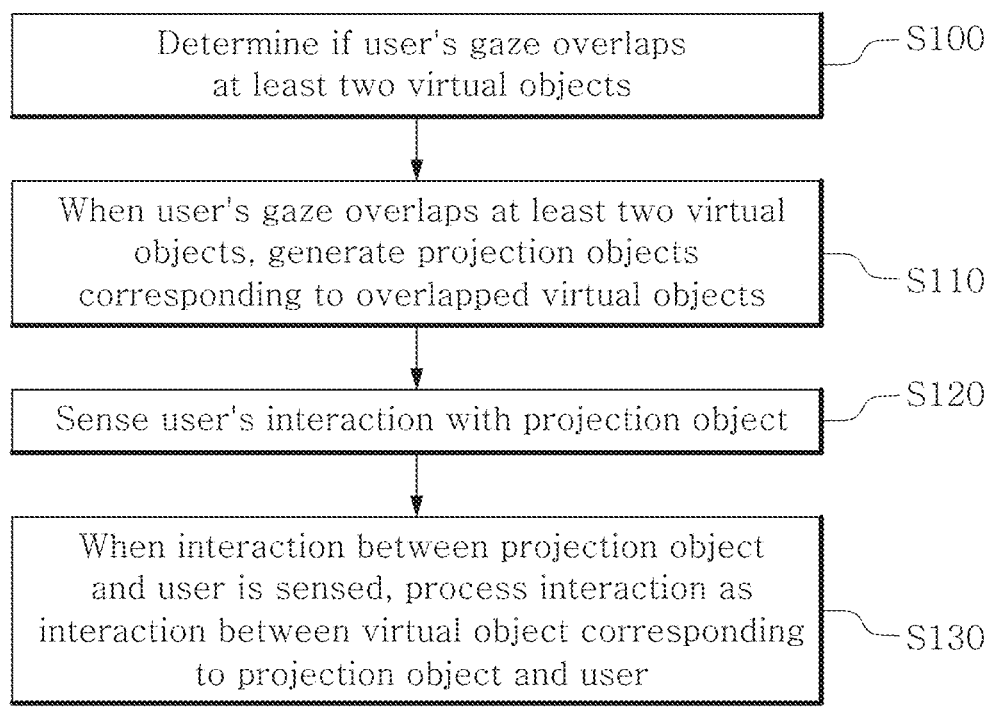
FIG. 7 is a flowchart of a method for controlling a user interface device according to another embodiment of the present disclosure.

FIG. 7 is a flowchart of the method for controlling a user interface device according to another embodiment of the present disclosure. The method according to this embodiment is a control method performed by the control unit of the device for providing a user interface applied to a 3D virtual space in which a plurality of virtual objects is created according to FIGS. 1 to 6 and its redundant description is omitted herein.

Referring to FIG. 7, the method for controlling a user interface device according to this embodiment includes determining if the user's gaze overlaps at least two virtual objects (S100), when the user's gaze overlaps at least two virtual objects, generating projection objects corresponding to the overlapped virtual objects (S110), sensing the user's interaction with the projection object (S120), and when the interaction between the projection object and the user is sensed, processing the interaction as an interaction between the virtual object corresponding to the projection object and the user (S130).

First, determination is made as to whether the user's gaze overlaps at least two virtual objects (S100).

The control unit 100 receives the user's gaze calculated from the gaze sensor unit 110, and determines if the user's gaze and the virtual object overlap. The gaze sensor unit 110 may calculate the user's gaze based on the user's current location. The step of determining if the user's gaze overlaps at least two virtual objects (S100) may comprise determining if the user's gaze and the virtual object overlap by determining if the user's gaze passes through the overlap range formed on the basis of the object center of the virtual object. Here, the virtual object may have physical information, and the object center may correspond to the center of gravity of the virtual object, but is not limited thereto. Additionally, the overlap range formed on the basis of the object center may correspond to the rendered appearance of the virtual object, but is not limited thereto. The overlap range may be defined beyond the rendered appearance of the virtual object.

When the user's gaze overlaps at least two virtual objects, projection objects corresponding to the overlapped virtual objects are generated (S110).

After recognizing that the user's gaze overlaps at least two virtual objects, the control unit 100 may provide an additional interface for easiness and accuracy of virtual object selection. The control unit 100 may further display projection objects corresponding to the plurality of objects overlapped in the user's gaze at different locations that do not overlap the user's gaze. That is, the control unit 100 may generate projection objects corresponding to the plurality of objects overlapped in the user's gaze and provide the projection objects to the user. Here, the location of the projection objects on the virtual space does not overlap the user's current gaze, but can be seen from the user's current location. That is, the user may see the location, shape and size of the projection objects at the current location, and easily select the projection objects.

Additionally, the step of generating the projection objects corresponding to the overlapped virtual objects (S110) may include forming a virtual mirror that forms a predetermined angle with the user's gaze, and the projection object may be displayed as being included in the virtual mirror. The predetermined angle may be determined in consideration of at least one of the distance between the user and the plurality of virtual objects and the placement location of the plurality of virtual objects.

The user's interaction with the projection object is sensed (S120).

The projection objects 331, 332, 333 and the corresponding virtual objects 131, 132, 133 may have the same physical information and graphical information, and only have different locations. That is, the user may interact with the projection objects 331, 332, 333, for example, may select the projection objects 331, 332, 333. The user may easily see the location, shape and size of the projection objects 331, 332, 333 by changing the gaze direction at the current location, and the user may easily interact with the projection object 333 corresponding to the target object 133. The user may interact with at least one of the plurality of projection objects 331, 332, 333.

When the interaction between the projection object and the user is sensed, the interaction is processed as an interaction between the virtual object corresponding to the projection object and the user (S130).

The interaction between the user and the projection object 333 may affect the corresponding virtual object 133. That is, the projection objects 331, 332, 333 are formed for effective interaction of the overlapped virtual objects 131, 132, 133, and a result of the user's interaction with the projection object 333 may be reflected on the corresponding virtual object 133. For example, when the user selects the projection object 333, the control unit 100 may regard and process as the user having selected the corresponding virtual object 133.

The method for controlling a user interface device according to another embodiment of the present disclosure may provide the additional interface for easiness and accuracy of virtual object selection after recognizing that the user's gaze overlaps at least two virtual objects. Accordingly, it is possible to select the overlapped virtual objects more accurately and easily, thereby reducing the miss-selection possibility, enhancing the convenience of use of the user interface, and reducing the total operation/manipulation time of an electronic device. Additionally, it is possible to reduce operations or movements to be performed for interactions in virtual space, thereby reducing fatigue of user manipulation.

The operation by the method for controlling a user interface device according to the embodiments described above may be, at least in part, implemented in a computer program and recorded in a computer-readable recording medium. The computer-readable recording medium, in which the program for performing the operation by the method for controlling a user interface device according to the embodiments is recorded, includes all types of recording devices in which computer-readable data is stored. Examples of the computer-readable recording medium include ROM, RAM, CD-ROM, magnetic tape, floppy disk, and optical data storage devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments, the present disclosure should not be interpreted as being limited to these embodiments or the drawings, and those skilled in the art will understand that various changes and modifications may be made to the present disclosure without departing from the spirit and scope of the present disclosure set forth in the appended claims.

What is claimed is:

1. A user interface device for providing a user interface applied to a three-dimensional (3D) virtual space in which a plurality of virtual objects is created, the user interface device comprising:

a gaze sensor unit to sense a user's gaze;

an interaction sensor unit to sense the user's body motion for interaction with the virtual objects in the 3D virtual space;

a display unit to display the 3D virtual space; and a control unit to, when the user's gaze overlaps at least two virtual objects, generate projection objects corresponding to the overlapped virtual objects, wherein when an interaction between the projection objects and the user is sensed, the control unit processes the interaction as an interaction between the virtual objects corresponding to the projection objects and the user, and wherein, in response to the generating of the projection objects, the control unit forms a virtual mirror that forms a predetermined angle with the user's gaze, and the projection objects are displayed as being included in the virtual mirror in a view that exposes an overlapped object.

2. The user interface device according to claim 1, wherein the projection objects and the virtual objects have same physical information and graphical information but different location information, and the projection objects are formed at a location of the 3D virtual space that does not overlap the user's gaze.

3. The user interface device according to claim 1, wherein the predetermined angle is determined in consideration of at least one of distance between the user and the plurality of virtual objects and placement location of the plurality of virtual objects.

4. The user interface device according to claim 1, wherein the control unit determines if the user's gaze and the virtual objects overlap by determining if the user's gaze passes through an overlap range formed on the basis of an object center of the virtual objects.

5. The user interface device according to claim 1, wherein the interaction between the projection objects and the user includes selection of the projection objects by the user, and when the projection objects are selected by the user, the control unit processes as the user having selected the virtual objects corresponding to the projection objects.

6. A method for controlling a user interface device, the user interface device for providing a user interface applied to a three-dimensional (3D) virtual space in which a plurality of virtual objects is created, the method comprising:

determining if a user's gaze overlaps at least two virtual objects;

in response to determining that the user's gaze overlaps the at least two virtual objects, generating projection objects corresponding to the overlapped virtual objects;

sensing the user's interaction with the projection objects; and when the interaction between the projection objects and the user is sensed, processing the interaction as an interaction between the virtual objects corresponding to the projection objects and the user;

wherein the generating the projection objects corresponding to the overlapped virtual objects comprises generating a virtual mirror that forms a predetermined angle with the user's gaze, and the projection objects are displayed as being included in the virtual mirror in a view that exposes an overlapped object.

7. The method for controlling a user interface device according to claim 6, wherein the projection objects and the virtual objects have same physical information and graphical information but different location information, and the projection objects are formed at a location of the 3D virtual space that does not overlap the user's gaze.

8. The method for controlling a user interface device according to claim 6, wherein the predetermined angle is determined in consideration of at least one of distance between the user and the plurality of virtual objects and placement location of the plurality of virtual objects.

9. The method for controlling a user interface device according to claim 6, wherein determining if the user's gaze overlaps the at least two virtual objects comprises determining if the user's gaze and the virtual objects overlap by determining if the user's gaze passes through an overlap range formed on the basis of an object center of the virtual objects.

10. The method for controlling a user interface device according to claim 6, wherein the interaction between the projection objects and the user includes selection of the projection objects by the user, and when the projection objects are selected by the user, the method processes as the user having selected the virtual objects corresponding to the projection objects.

11. A computer-readable recording medium containing a computer program product, the computer program product being configured to perform a method comprising:

determining if a user's gaze overlaps at least two virtual objects;

in response to determining that the user's gaze overlaps the at least two virtual objects, generating projection objects corresponding to the overlapped virtual objects;

sensing the user's interaction with the projection objects; and when the interaction between the projection objects and the user is sensed, processing the interaction as an interaction between the virtual objects corresponding to the projection objects and the user;

wherein the generating the projection objects corresponding to the overlapped virtual objects comprises generating a virtual mirror that forms a predetermined angle with the user's gaze, and the projection objects are displayed as being included in the virtual mirror in a view that exposes an overlapped object.

* * * * *